United States Patent
Hasson et al.

(10) Patent No.: US 9,654,544 B2
(45) Date of Patent: May 16, 2017

(54) TIME-OUT MANAGEMENT FOR SESSION DEPENDENT APPLICATIONS

(75) Inventors: Laurent D. Hasson, New York, NY (US); Jianren Li, Valhalla, NY (US); Qun Zhou, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1436 days.

(21) Appl. No.: 10/894,482

(22) Filed: Jul. 19, 2004

(65) Prior Publication Data

US 2006/0080383 A1    Apr. 13, 2006

(51) Int. Cl.
*H04L 29/08*    (2006.01)
*G06F 1/32*    (2006.01)
*H04L 29/06*    (2006.01)

(52) U.S. Cl.
CPC .............. *H04L 67/06* (2013.01); *H04L 67/14* (2013.01); *H04L 67/143* (2013.01); *H04L 67/145* (2013.01); *H04L 67/34* (2013.01); *H04L 69/28* (2013.01)

(58) Field of Classification Search
CPC ..... G06F 1/3231; G06F 1/3228; H04L 67/14; H04L 67/143; H04L 67/145
USPC .............. 709/223; 713/201; 705/37; 711/118
See application file for complete search history.

(56) References Cited

U.S. PATENT DOCUMENTS

| | | | |
|---|---|---|---|
| 5,928,363 A * | 7/1999 | Ruvolo | ............................ 726/22 |
| 5,954,798 A | 9/1999 | Shelton et al. | |
| 6,189,024 B1 | 2/2001 | Bauersfeld et al. | |
| 6,678,791 B1 * | 1/2004 | Jacobs et al. | .................. 711/118 |
| 6,747,894 B2 * | 6/2004 | Kawamura | .......... G11C 11/5628 365/185.03 |
| 8,156,209 B1 * | 4/2012 | Phadnis | .............. H04L 12/2859 709/223 |
| 2001/0054020 A1 * | 12/2001 | Barth et al. | ..................... 705/37 |
| 2002/0055997 A1 * | 5/2002 | Pinnell | .......................... 709/224 |
| 2002/0078191 A1 | 6/2002 | Lorenz | |
| 2002/0083134 A1 | 6/2002 | Bauer, Jr. et al. | |
| 2003/0033405 A1 | 2/2003 | Perdon et al. | |
| 2003/0069962 A1 * | 4/2003 | Pandya | ......................... 709/224 |
| 2003/0135626 A1 | 7/2003 | Ray et al. | |
| 2003/0163516 A1 | 8/2003 | Perkins et al. | |
| 2005/0108570 A1 * | 5/2005 | Gopalraj | ............... H04L 67/143 726/4 |
| 2006/0020707 A1 * | 1/2006 | Undery | .................. H04L 29/06 709/230 |

\* cited by examiner

*Primary Examiner* — Tae Kim
(74) *Attorney, Agent, or Firm* — Steven M. Greenberg, Esq.; CRGO Law

(57) ABSTRACT

A method, system and apparatus for time-out management for session-dependent applications. A time-out management system can include one or more of pages defining a session-dependent application. The system further can include a server-side time-out manager configured for use in a content server in detecting a time-out condition in the session-dependent application when the session-dependent application has been distributed to a content client. Finally, the system can include at least one client-side time-out manager configured to detect activity for the session-dependent application and to notify the content server when activity is detected in the session-dependent application when the session-dependent application has been distributed to the content client.

7 Claims, 2 Drawing Sheets

TIME-OUT MANAGEMENT FOR SESSION DEPENDENT APPLICATIONS

BACKGROUND OF THE INVENTION

Statement of the Technical Field

The present invention relates to session dependent applications, and more particularly to time-out management for session dependent applications.

Description of the Related Art

Prior to the advent of the global Internet, distributed applications were difficult and expensive to deploy and maintain. Specifically, heavyweight clients were configured for proprietary interoperation with backend servers over private communications networks. Modifications to the operating logic of distributed applications often required wholesale changes both to the clients and the servers in the client-server environment. Scalability often became stifled by the nature of the distributed application, the limitations of a proprietary network and the costs of maintaining application specific clients. Accordingly, the ubiquity of the distributed application became a reality only in consequence of the efficient nature of the global Internet and presently established hypermedia document distribution technologies.

The World Wide Web (hereinafter, the "Web"), the most prevalent implementation of a hypermedia document distribution technology, provides an ideal platform for delivering cost effective application logic with unlimited scalability and marginal client side requirements. In most cases, a simple Web browser can suffice as a lightweight client portion of a distributed application. The bulk of the logic of an application can be delivered either as part of a Web page, or the logic of the application can be hosted centrally in the server and accessed and controlled by embedded logic in a Web page. Recent advances in portable programming language interpretation and execution, including Java-type technologies permit further sophistication in regard to distributed applications such that there is little which can be accomplished using a traditional client-server architecture which cannot also be accomplished in a Web based application.

Nevertheless, human factors challenges remain in respect to the distribution of a Web application. For many, the Web has created a user experience that is considered a step backward from what existed previously in the client-server world. In the client-server world, clients enjoyed arbitrary richness as provided by the hosting graphical user interface-based operating system. Even though Web interfaces appear to be quite graphical in nature, the actual interactivity model for Web based applications remains restrictive at best. The perceptible performance gap resulting from full screen refreshes have been an issue for some time. Accordingly, great attention has been paid to closing the performance gap between traditional client-server user interface technology and Web application user interface technology.

One popular technique used to close the perceptible performance gap for the Web application includes the notion of "making pages last longer". In this regard, distributed Web pages incorporate substantial logic and data in a model-view-controller arrangement so as to avoid more frequent page updates which otherwise would be required where the data and logic of an application remains fixed in a centralized server. Still, limiting the interactions between the content browser and content server, maintaining session state in session-dependent stateful Web application can be difficult. Specifically, many session dependent Web applications determine when a session has gone "stale" by detecting a time-out condition in the application. Generally, a time-out condition arises where no activity has been detected by the server over a threshold period of time. Accordingly, reconciling the contrasting requirements of a long-lasting Web page and frequent client activity can be difficult under the circumstance.

SUMMARY OF THE INVENTION

The present invention addresses the deficiencies of the art in respect to time-out management in a session dependent application and provides a novel and non-obvious method, system and apparatus for time-out management for session-dependent applications. In a preferred aspect of the present invention, a time-out management system can include one or more of pages defining a session-dependent application. The system further can include a server-side time-out manager configured for use in a content server in detecting a time-out condition in the session-dependent application when the session-dependent application has been distributed to a content client. Finally, the system can include at least one client-side time-out manager configured to detect activity for the session-dependent application and to notify the content server when activity is detected in the session-dependent application when the session-dependent application has been distributed to the content client.

The client-side time-out manager can be configured for distribution to the content clients as part of the pages. In this regard, the client-side time-out manager can be defined as a server page for use along with a composition of pages rendered in the content client. Finally, the client-side time-out manager can be configured to detect activity for the session-dependent application and to ping the content server when activity is detected in the session-dependent application when the session-dependent application has been distributed to the content client.

A time-out management method can include the step of listening for activity in association with a session dependent application rendered in a client-side content browser. Responsive to detecting the activity within a pre-specified client-side time-out interval, a content server host of the session dependent application can be notified to maintain a session between the client-side content browser and the content server host. Preferably, the method also can include determining a time-out condition in the client-side content browser and rendering a prompt to continue the session. If a response to the prompt is detected, the content server host can be notified to maintain the session. In this regard, the notification can be performed responsive to detecting one of mouse movement, a mouse click or a keyboard stroke in the client-side content browser within the pre-specified client-side time-out interval.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for time-out management in a session dependent application. In accordance with the present invention, a client-side time-out manager can be disposed in content distributed to a content browser from a content server as part of a session dependent application. The client-side time-out manager can monitor activity occurring in the session dependent application resident in the client or in association with the session dependent application resident in the client. So long as activity is detected within a client-side time-out interval, a notification can be transmitted to a server-side time-out manager so as to ensure that the server-side time-out manager will not declare a time-out condition in the client for a session established between the client and server.

Figure 1:
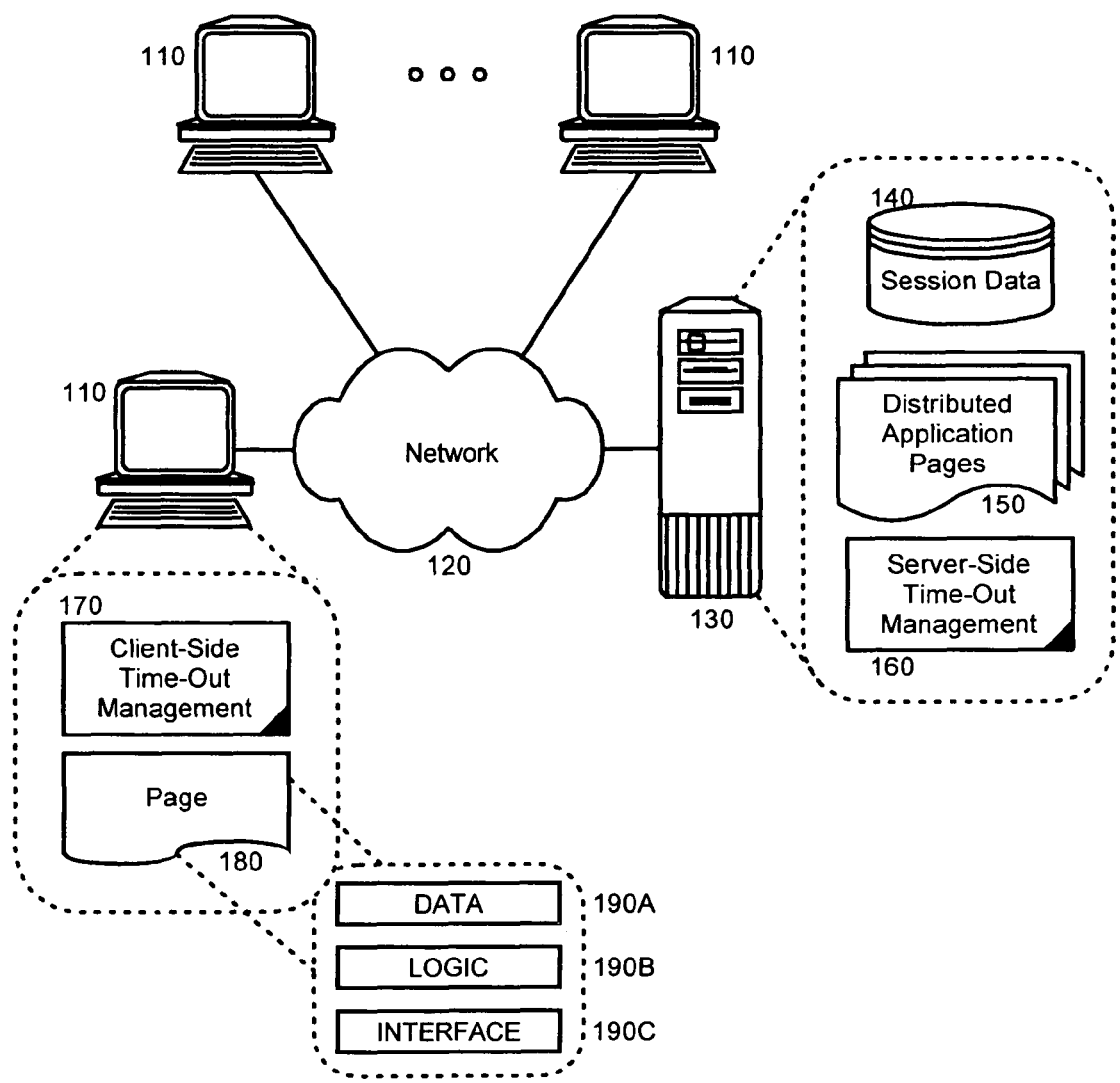
FIG. 1 is a schematic illustration of a system hosting a session dependent application configured for time-out management in accordance with the present invention; and, FIG. 2 is a flow chart illustrating a process for time-out management in a session dependent application in the system of FIG. 1.

In more particular illustration, FIG. 1 is a schematic illustration of a system hosting a session dependent application configured for time-out management in accordance with the present invention. The system can include a content server 130 communicatively coupled to one or more content browsing clients 110 over a data communications network 120 such as the global Internet. The content server 130 can include a distributed, session-dependent application defined by one or more content pages 150. For example, the content pages 150 can be Web pages containing markup defining user interface elements, data elements and logic elements.

A data store of session data 140 further can be included in the content server 130. The data store of session data 140 can store session related data for individual ones of the content clients 110 generated in the course of maintaining application sessions with the content clients 110. Finally, one or more server-side time out management processes 160 can be included within the server 130. Each server-side time-out management process 160 can track activity in content clients 110 which participate in a session with the content server 130. When no activity can be detected in a content client 110 engaged in a session with the content server 130 during a specified time-out interval, the session with the content client 110 can be terminated.

Importantly, the content clients 110 can process retrieved pages 180 from the content server 130 to render the user interface 190C of the session dependent application. Optionally, the pages 180 further can define application data 190A and application logic 190B which can be processed in the content clients 110. Notably, the pages 180 further can define a client-side time-out management process 170. The client-side time out management process 170 can track activity within corresponding ones of the content clients 110 to detect idleness over the course of a client-side time-out interval. Preferably, the client-side time-out interval can be of a shorter duration than the server-side time-out duration relied upon by the server-side time-out management process 160.

So long as the client-side time-out management process 170 detects activity in association with the session-dependent application, for example mouse movement, mouse click, or a keyboard stroke, the client-side time-out management process 170 can spoof client-side activity for the benefit of the content server 130. In this regard, the client-side time-out management process 170 can transmit a notification to the content server 130 which can indicate activity to the server-side time-out management process 160. Otherwise, the client-side time-out management process 170 can allow the session between the content client 110 and the content server 130 to lapse through inactivity and the natural operation of the server-side time-out management process 160.

Figure 2:
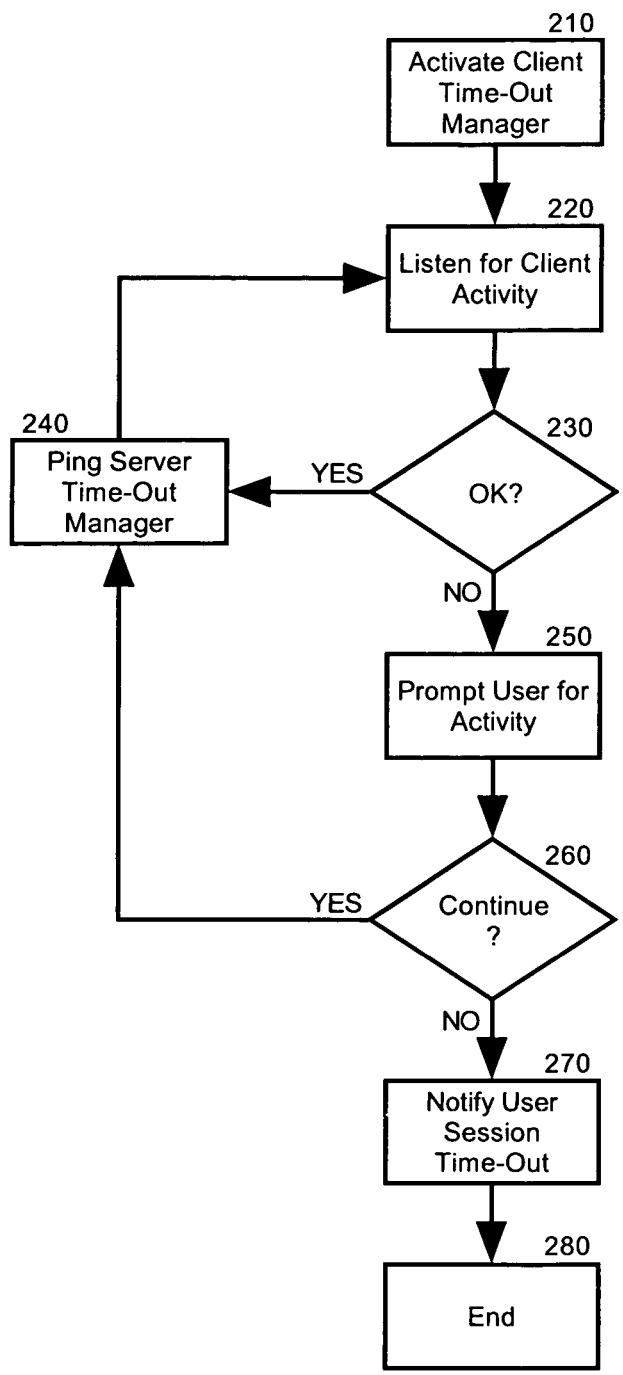

In more particular illustration of a preferred aspect of the present invention, FIG. 2 is a flow chart illustrating a process for time-out management in a session dependent application in the system of FIG. 1. Beginning in block 210, upon the distribution of a page of a session-dependent application to a content browser within a content client, a client-side time-out manager can be activated. Preferably, the client-side time-out manager can be a server page loaded into a frame within a composition of pages in the content browser. In block 220, the client-side time-out manager can listen for activity in the content browser.

In decision block 230, if activity is detected in the content browser, in block 240 the client-side time-out manager can ping the content server to indicate activity in the content server. Subsequently, in block 220 the client-side time-out manager can continue to listen for activity in the content browser. If, however, in decision block 230 no activity is detected in the content browser during a client-side time-out interval, in block 250 the client-side time-out manager can generate a prompt for activity. If a response to the prompt is detected, once again in block 240 the content server can be pinged. Otherwise, in block 270 a notification can be generated specifying the lapsing of the session and in block 280 the process can end.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A time-out management system comprising at least one processor configured to perform:
    distributing a session-dependent application from a content server to a content browser within a content client, wherein a client-side time-out manager is disposed in content distributed to the content browser from the content server as part of the session dependent application;
    tracking interactions between the content client and the content server during a session of the session-dependent application by a server-side time-out manager using a first time-out threshold time interval, wherein the session is terminated upon no activity detected by the server-side time-out manager during the first time-out threshold time interval;
    tracking activities within the content browser occurring in the session dependent application by the client-side time-out manager using a second time-out threshold time interval, wherein the second time-out threshold time interval is shorter than the first time-out threshold time interval; and,
    responsive to detecting an activity within the content browser occurring in the session dependent application within the second time-out threshold time interval, spoofing, during an post-second time-out threshold interval period of time between an expiration of the second time-out threshold interval and an expiration of the first time-out threshold time interval, client-side activity even when no activity occurs in the content browser by falsely indicating to the server-side time-out manager that activity has occurred in the content browser in connection with the session dependent application during the post-second time-out threshold interval period of time when no activity in fact has occurred in the content browser in connection with the session dependent application during the post-second time-out threshold interval period of time.

2. A time-out management method comprising the steps of:
    distributing a session-dependent application from a content server to a content browser within a content client, wherein a client-side time-out manager is disposed in content distributed to the content browser from the content server as part of the session dependent application;
    tracking interactions between the content client and the content server during a session of the session-dependent application by a server-side time-out manager using a first time-out threshold time interval, wherein the session is terminated upon no activity detected by the server-side time-out manager during the first time-out threshold time interval;
    tracking activities within the content browser occurring in the session dependent application by the client-side time-out manager using a second time-out threshold time interval, wherein the second time-out threshold time interval is shorter than the first time-out threshold time interval; and,
    responsive to detecting an activity within the content browser occurring in the session dependent application within the second time-out threshold time interval, spoofing, during an post-second time-out threshold interval period of time between an expiration of the second time-out threshold interval and an expiration of the first time-out threshold time interval, client-side activity even when no activity occurs in the content browser by falsely indicating to the server-side time-out manager that activity has occurred in the content browser in connection with the session dependent application during the post-second time-out threshold interval period of time when no activity in fact has occurred in the content browser in connection with the session dependent application during the post-second time-out threshold interval period of time.

3. The method of claim 2, further comprising the steps of:
    determining a time-out condition in said client-side content browser;
    rendering a prompt to continue said session; and,
    notifying the server-side time-out manager to maintain said session if a response to said prompt is detected.

4. The method of claim 2, wherein the activities within the content browser include one of mouse movement, a mouse click or a keyboard stroke in said client-side content browser within the second time-out threshold time interval.

5. A non-transitory machine readable storage medium having stored thereon a computer program for time-out management, the computer program comprising a routine set of instructions which when executed by a machine cause the machine to perform the steps of:
    distributing a session-dependent application from a content server to a content browser within a content client, wherein a client-side time-out manager is disposed in content distributed to the content browser from the content server as part of the session dependent application;
    tracking interactions between the content client and the content server during a session of the session-dependent application by a server-side time-out manager using a first time-out threshold time interval, wherein the session is terminated upon no activity detected by the server-side time-out manager during the first time-out threshold time interval;
    tracking activities within the content browser occurring in the session dependent application by the client-side time-out manager using a second time-out threshold time interval, wherein the second time-out threshold time interval is shorter than the first time-out threshold time interval; and,
    responsive to detecting an activity within the content browser occurring in the session dependent application within the second time-out threshold time interval, spoofing, during an post-second time-out threshold interval period of time between an expiration of the second time-out threshold interval and an expiration of the first time-out threshold time interval, client-side activity even when no activity occurs in the content browser by falsely indicating to the server-side time-out manager that activity has occurred in the content browser in connection with the session dependent application during the post-second time-out threshold interval period of time when no activity in fact has occurred in the content browser in connection with the session dependent application during the post-second time-out threshold interval period of time.

6. The machine readable storage medium of claim 5, further comprising a routine set of instructions for causing the machine to perform the steps of:
    determining a time-out condition in said client-side content browser;
    rendering a prompt to continue said session; and, notifying the server-side time-out manager to maintain said session if a response to said prompt is detected.

7. The machine readable storage medium of claim 5, wherein the activities within the content browser include one of mouse movement, a mouse click or a keyboard stroke in said client-side content browser within the second time-out threshold time interval.

\* \* \* \* \*